United States Patent [19]

Sommargren

[11] 4,353,650

[45] Oct. 12, 1982

[54] LASER HETERODYNE SURFACE PROFILER

[75] Inventor: Gary E. Sommargren, Livermore, Calif.

[73] Assignee: The United States of America as represented by the United States Department of Energy, Washington, D.C.

[21] Appl. No.: 159,893

[22] Filed: Jun. 16, 1980

[51] Int. Cl.³ .......................... G01B 11/30; G01B 9/02
[52] U.S. Cl. .................................... 356/371; 356/351; 356/359; 356/360; 356/369
[58] Field of Search ......................... 356/371, 375–376, 356/349, 351, 353, 364, 368, 359–360, 5, 369; 250/225; 350/403, 407

[56] References Cited

U.S. PATENT DOCUMENTS

| | | | |
|---|---|---|---|
| 3,463,924 | 8/1969 | Culshaw et al. | 356/349 |
| 3,472,593 | 10/1969 | Drinkwater | 356/28 |
| 3,523,735 | 8/1970 | Taylor | 356/349 |
| 3,620,593 | 11/1971 | Tackaberry | 350/403 |
| 3,768,910 | 10/1973 | Zanoni | 356/369 |
| 3,796,495 | 3/1974 | Laub | 356/359 |
| 3,952,583 | 4/1976 | Rosati | 73/71.3 |
| 4,093,380 | 6/1978 | White | 356/5 |
| 4,171,908 | 10/1979 | Robert et al. | 356/366 |

FOREIGN PATENT DOCUMENTS

| | | | |
|---|---|---|---|
| 45-31425 | 8/1964 | Japan | 350/157 |
| 54-11764 | 1/1979 | Japan | 356/371 |
| 717233 | 10/1954 | United Kingdom | 356/353 |

OTHER PUBLICATIONS

Okoomian, H. J., "A Two-Beam Polarization Technique to Measure Optical Phase", App. Optics, 11/69, pp. 2363–2365.

Primary Examiner—William H. Punter
Attorney, Agent, or Firm—Clifton E. Clouse, Jr.; Roger S. Gaither; Richard G. Besha

[57] ABSTRACT

A method and apparatus is disclosed for testing the deviation of the face of an object from a flat smooth surface using a beam of coherent light of two plane-polarized components, one of a frequency constantly greater than the other by a fixed amount to produce a difference frequency with a constant phase to be used as a reference. The beam also is split into its two components with the separate components directed onto spaced apart points on the face of the object to be tested for smoothness. The object is rotated on an axis coincident with one component which is directed to the face of the object at the center which constitutes a virtual fixed point. This component also is used as a reference. The other component follows a circular track on the face of the object as the object is rotated. The two components are recombined after reflection to produce a reflected frequency difference of a phase proportional to the difference in path length which is compared with the reference phase to produce a signal proportional to the deviation of the height of the surface along the circular track with respect to the fixed point at the center.

15 Claims, 12 Drawing Figures

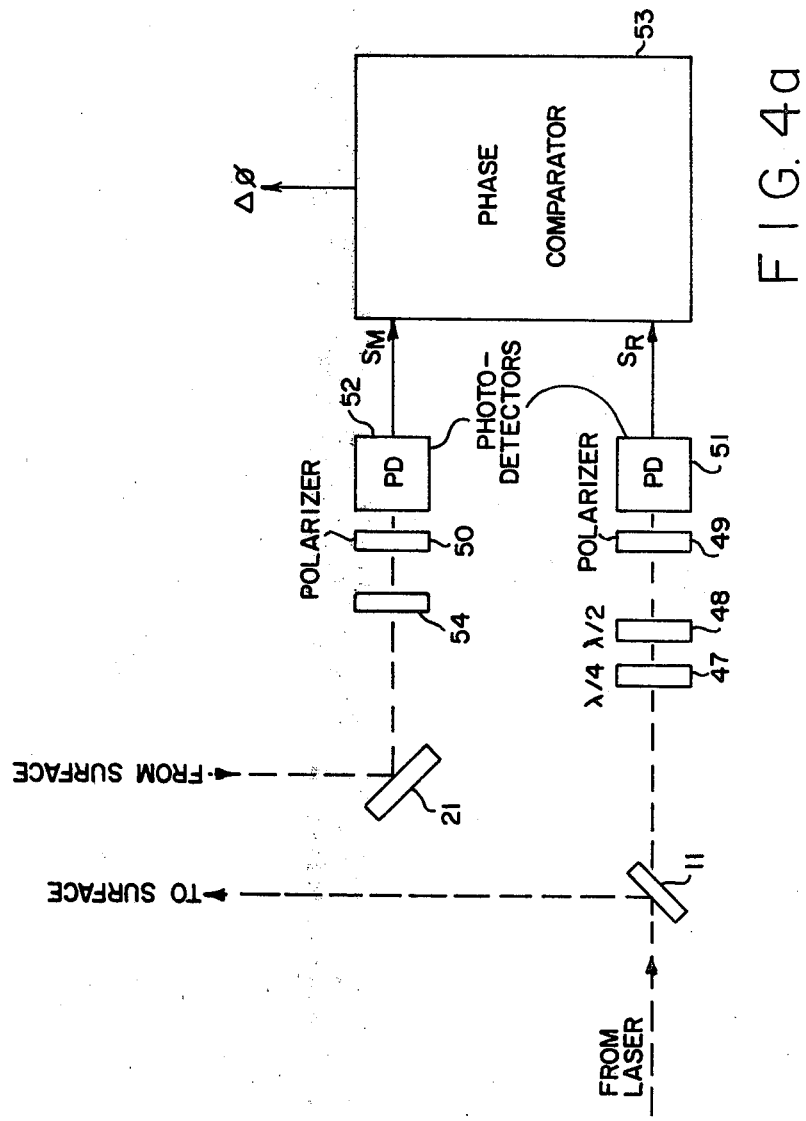

Surface profile 5.9A RMS  27A P-V  3A ASTIG

BK-7
5/22/80 - 9:27 AM

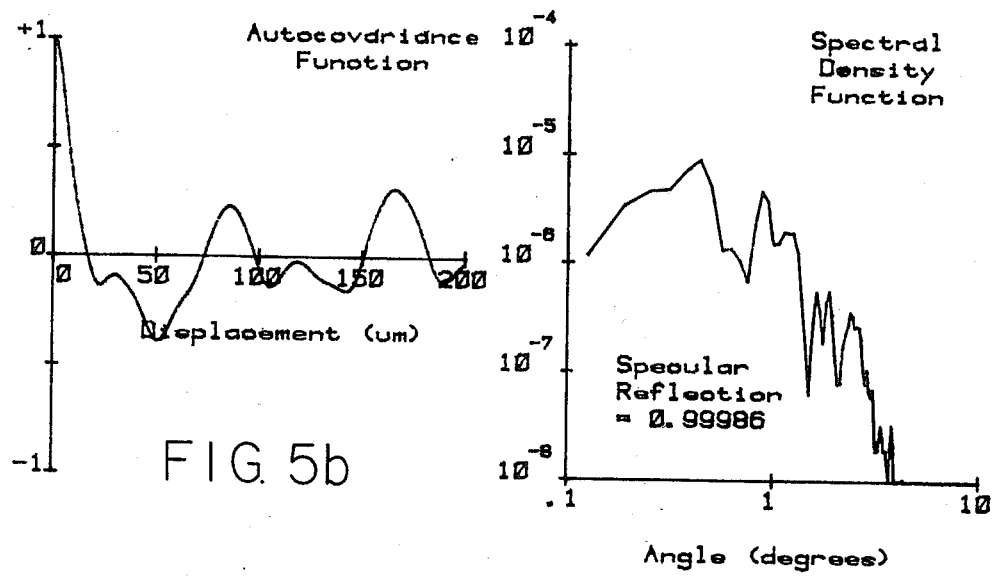
FIG. 5b
FIG. 5c
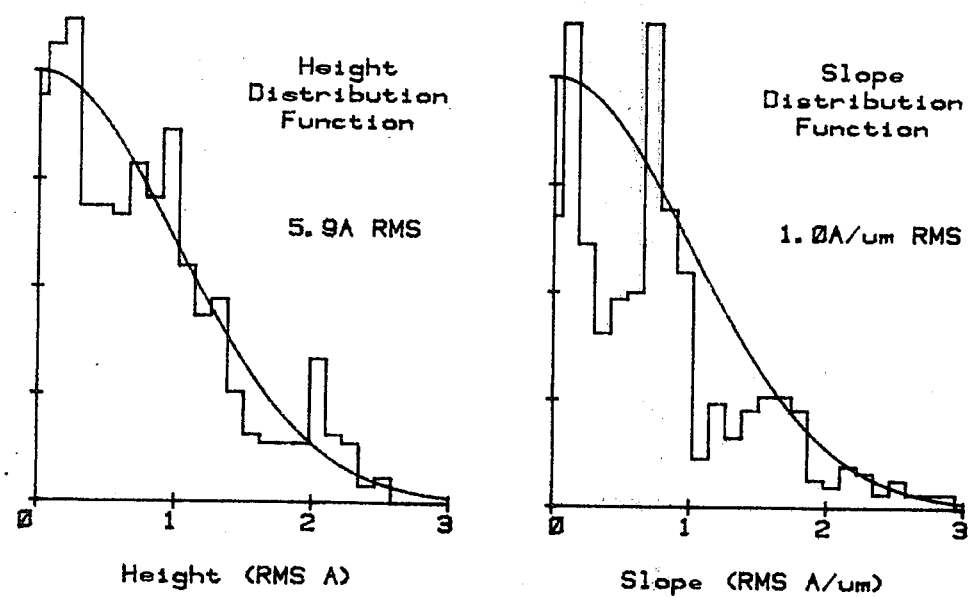
FIG. 5d
FIG. 5e

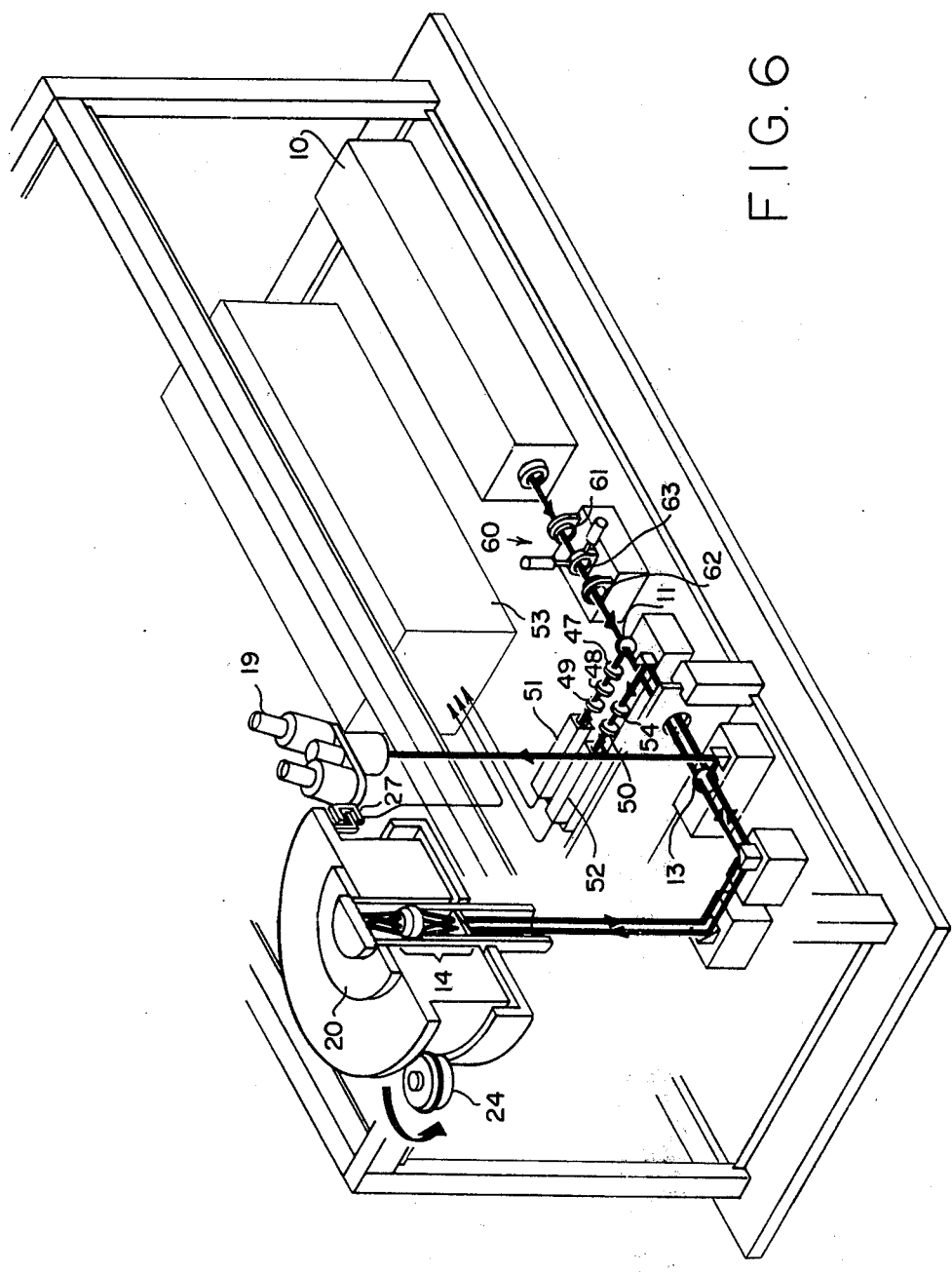

4,353,650

LASER HETERODYNE SURFACE PROFILER

BACKGROUND OF THE INVENTION

The invention described herein resulted from Contract W-7405-ENG-48 between the U.S. Department of Energy and the University of California.

The invention relates to a surface profiler, and more particularly to an optical method and system for measuring the depth profile of a surface along a selected track.

It is frequently necessary to perform precision machining on a surface. In many applications the depth profile (smoothness) of a surface is a major parameter controlling the manner in which that surface will reflect without scattering incident radiation energy or particles. Consequently, to support major laboratory programs, and to provide precision instrumentation for industry as well, such as for industrial process control systems, it is essential that the depth profile of a machined surface be measured with precision. An example of this dependence of instrumentation on surface smoothness is a laser system which depends upon the various optical components utilized therein. It is desirable to test the depth profile of critical parts of such a system.

OBJECTS AND SUMMARY OF THE INVENTION

An object of this invention is to provide a nonmechanical and nondestructive method and apparatus for measurement of the depth profile of a surface within a fraction of a wavelength, i.e., with a precision measured in Angstroms.

Yet another object is to provide means for adjusting the phase of the difference frequency of a beam having two orthogonally polarized components, such as for use as a reference in a dual-beam difference frequency interferometer.

These and other objects of the invention are achieved in a novel system for measuring the deviation of the face of an object from a flat smooth surface. The system is comprised of a source of a dual frequency beam, and means for splitting the beam into its two plane-polarized components at frequencies $f_1$ and $f_2$ which are orthogonally polarized. The two components are focused onto two displaced points, at least one of which is on the face of an object under test, by suitable optical means while the object is moved to measure the depth profile on a track along which the one beam falls. Both points may be on the face of the object, and if the object is moved only by rotation on an axis normal to the face of the object under test and passing precisely through one of the two points, the surface smoothness (height variations) is absolute for each point on the circular track. Otherwise, the surface smoothness is only relative as between the tracks of the two points on the surface. After reflection by the face under test, the two components are recombined, but the phase of the difference frequency is shifted relative to the phase of the reference frequency difference out of the source due to surface height variations of the face under test. The recombined components, and the reference components from the source, are received by means for detecting their phase difference, $\Delta\phi$, from which surface height difference, $\Delta h$, is determined by computing means as a measurement of the surface smoothness (height variations). The computed values of $\Delta h$ may be plotted as a function of position of the measurement beam components on the object by suitable plotting means.

In order to initially adjust the phase of the difference frequency out of the source for $\Delta\phi=0°$ at the phase detection means, the reference channel of the phase detection means is provided with means for adjusting the phase of the reference frequency difference. This phase adjusting means is comprised of a quarter-wave plate, a half-wave plate and a polarizer in sequence. The quarter-wave plate and polarizer are fixed with their optic axis at 45° with respect to the two incident orthogonal components from the source, while the axis of the half-wave plate is adjustable in its orientation so that the phase of the reference signal is dependent upon the angle of the axis of the half-wave plate. The phase of the reference frequency difference may thus be adjusted through a full range of 0° to 360° as required to coincide with the phase of the measurement frequency difference prior to testing the face of an object for smoothness.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 4a is a block diagram of a phase detector with zero phase adjustment in the reference channel for use in the system of FIG. 1.

FIG. 5a illustrates a typical surface profile plot produced by the invention of FIG. 1, and FIGS. 5b, c, d and e are graphs of the respective autocovariance function, spectral density function, height distribution function and slope distribution function of the data shown in the plot of FIG. 5a.

FIG. 6 illustrates schematically the optical layout of a heterodyne surface profiler according to the invention described with reference to FIGS. 1 through 4.

Reference will now be made in detail to preferred embodiments of the invention, an example of which is illustrated in the accompanying drawings.

DESCRIPTION OF PREFERRED EMBODIMENTS

Figure 1:
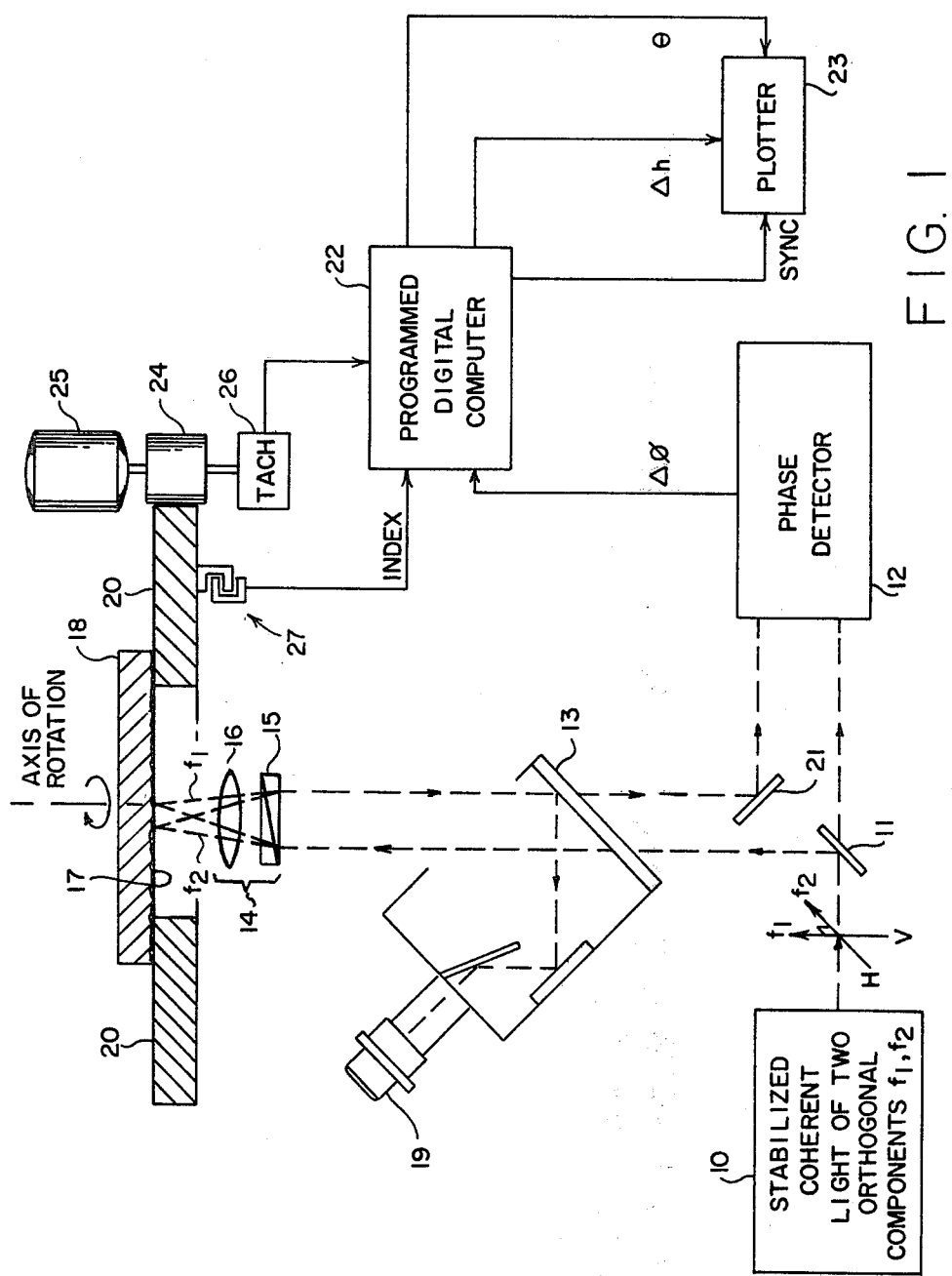
FIG. 1 is a schematic block diagram of the present invention.

Referring now to FIG. 1 of the drawings, a schematic diagram of an exemplary embodiment is shown for a dual frequency laser heterodyne surface profiler. A stabilized source 10 of high intensity coherent light produces a beam of two plane-polarized and orthogonal components at frequencies, $f_1$ and $f_2$, which are preferably separated by 2 MHz. Such a source may be a stabilized Zeeman split-He:Ne laser shown in FIG. 2. The beam is divided by beamsplitter 11 which transmits a small portion of the beam as a reference to a phase detector 12, and reflects the balance of the beam to a second beamsplitter 13.

The portion of the beam transmitted through the beamsplitter 13 passes through a birefringent prism assembly 14 which is comprised of a Wollaston prism 15 and a lens 16. The Wollaston prism splits the incident beam into its two frequency components, $f_1$ and $f_2$. The lens in turn focuses the two components on two spaced apart points on the face 17 of an object 18, as shown at points $P_1$ and $P_2$ in FIG. 3a. The beamsplitter 13 directs some of the reflected light into a microscope eyepiece 19 for checking the focus of the two components on the displaced points. The lens 16 serves as an objective lens for the microscope. Once the check has been made, and the objective lens has been adjusted to achieve the desired focus, the beamsplitter 13 is removed from the laser beam path.

One of the incident components is focused on the point $P_1$ which lies precisely on the axis of rotation of a turntable 20 supporting the object 18. The other component is focused on the point $P_2$ an arbitrary distance away from the axis of rotation so that as the table turns, the other component reflects from successive points on an annular track on the face 17 of the object. On reflection, the beams are recombined by the prism assembly 14 and directed by a reflecting plate 21 to the phase detector 12. The optical path length difference for the two orthogonally polarized components, $f_1$ and $f_2$, of the measurement beam results in a phase shift of their difference frequency upon being recombined. This phase shift, $\Delta\phi$, is detected as a phase difference between the reference frequency difference of the beam received through the beamsplitter 11 and the measurement frequency difference received from the prism assembly. The phase shift at each sampling point is a measurement of surface height difference, $\Delta h$, which is calculated by a computer 22 and plotted by a suitable plotter 23.

The computer is preferably a digital computer programmed to also control the plotter in order to plot the surface height difference, $\Delta h$, as a function of angular position, $\theta$, of the object. The turntable 20 is rotated by a pressure roller 24 driven by a motor 25. A tachometer 26 may be used to provide necessary angular position data to the computer which controls the angular position of the plotter 23. Alternatively, an index marking transducer 27, comprised of a light emitting diode and photodetector, may be used to time each revolution of the turntable. If data is sampled at a number of equally spaced intervals, such as 512 samples per revolution, then it can be plotted with one sample point every seven-tenths of one degree beginning at the index position of the turntable. In either case, i.e., whether a tachometer or a timing counter is used to divide a revolution into segments in the computer, an index pulse from the transducer 27 is relied upon to orient the plotted data with respect to the object under test on the table.

Figure 2:
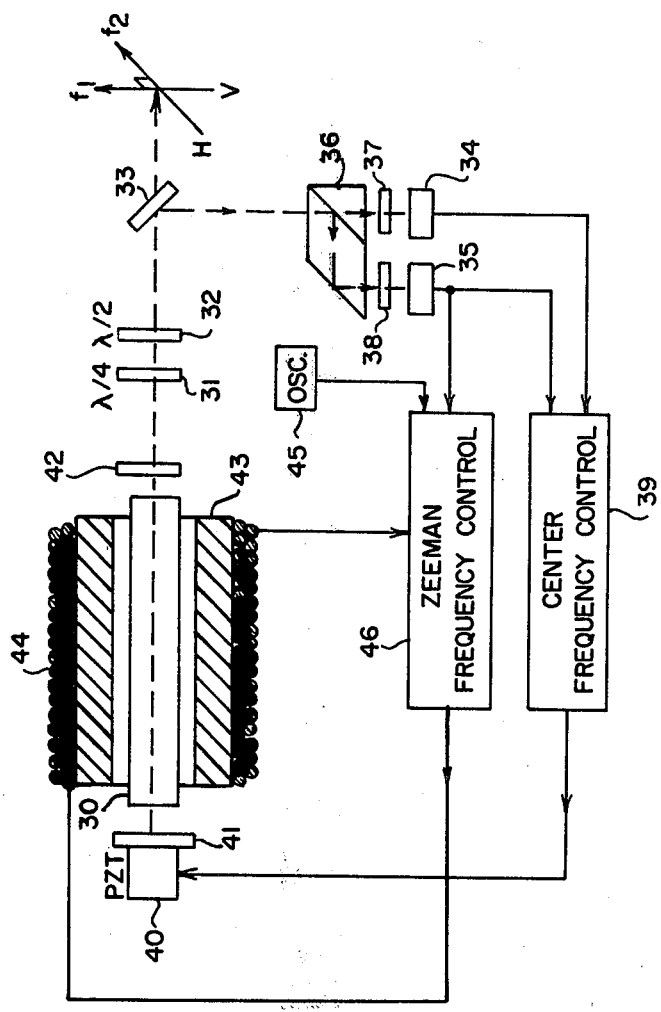
FIG. 2 is a schematic diagram of a stabilized split frequency laser beam with orthogonally polarized components for use in the system of FIG. 1.

Before proceeding further with a description of the system of FIG. 1, an exemplary coherent light source will be described with reference to FIG. 2 which shows schematically a modified laser head of a Model 5526A Laser Measurement System manufactured by Hewlett-Packard. A plasma tube 30, such as a helium-neon plasma tube, supplies a coherent light beam with components of two frequencies, $f_1$ and $f_2$, which are orthogonally polarized by a quarter-wave plate 31 and a half-wave plate 32. Part of the light beam is reflected by a beamsplitter 33 and applied to photodetectors 34 and 35 through a polarizing beamsplitter 36 and polarizers 37 and 38. The polarizing beamsplitter 36 separates the two components for separate detection. The output of the detectors 34 and 35 provide signals to a unit 39 which combines them to provide center frequency control by so adjusting the spacing between reflectors of the laser as to maintain the dc levels the signals from the detectors 34 and 35 equal. That is accomplished by applying the output of the center frequency control unit to a piezoelectric transducer (PZT) 40 to adjust the space between laser cavity mirrors 41 and 42 equal amplitudes of the frequencies $f_1$ and $f_2$. That only stabilizes the central spectral line, and does not prevent the difference between the two frequencies from drifting.

The two frequencies $f_1$ and $f_2$ are produced in the laser tube by Zeeman splitting the central spectral line. The main spectral line of helium-neon is 6328A. A variable axial magnetic field is applied by an annular permanent magnet 43 and a coil 44 around the magnet to produce the Zeeman effect. A crystal oscillator 45 applies a 2 MHz modulation signal to Zeeman frequency control unit 46 which also receives a difference frequency signal from the detector 35. That difference frequency will normally be very close to the 2 MHz signal from the oscillator. The control unit 46 compares that difference frequency from the detector 35 and oscillator 45 and produces a dc feedback signal in coil 44 to drive the difference frequency of the laser to the frequency of the oscillator. Each frequency component must necessarily be spaced equally from the center line which is stabilized by the center frequency control unit 39. The laser tube output is thus a light beam composed of two frequencies separated by a constant 2 MHz, a first frequency, $f_1$, with right circular polarization, and a second frequency, $f_2$, with left circular polarization.

The light beam passes through the assembly of the quarter-wave plate 31 and the half-wave plate 32 which converts the circular polarization of the two frequency components to orthogonally polarized linear components. That assembly is so oriented as to achieve this conversion with the linear components in known planes conveniently selected to be vertical, V, and horizontal, H, (as indicated in FIG. 1) for ease of subsequent processing.

Figures 3A, 3B:
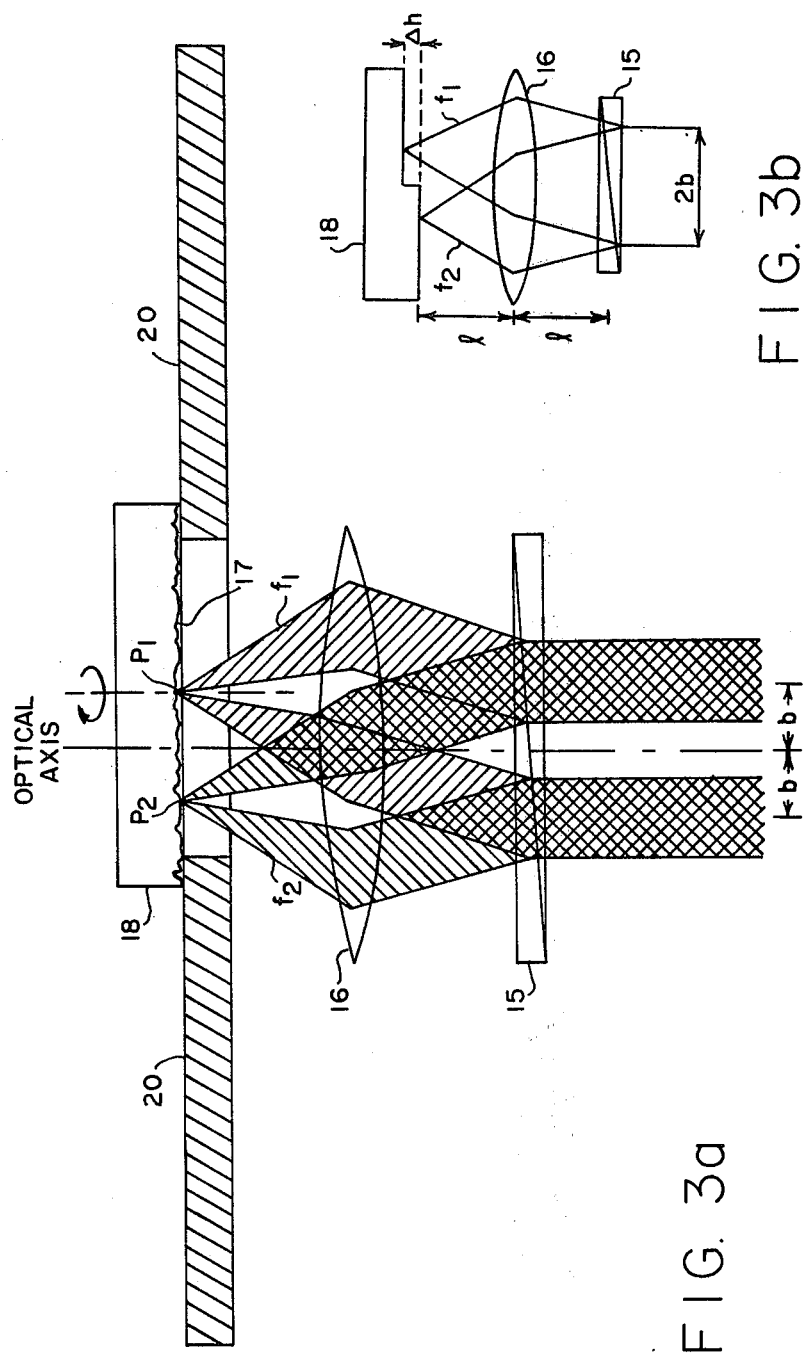
FIG. 3a illustrates the manner in which the orthogonally polarized components of laser beam are split into two components, focused on separate reflecting points of a surface under test, and recombined after reflection, to modulate the phase of the frequency difference according to the difference in optical path length of the split components, as a function of surface height, $\Delta h$, as shown in FIG. 3b.

The two output frequencies of the laser passing through the beamsplitter 33 are split by the Wollaston prism 15, as noted hereinbefore with reference to FIG. 1 and shown in FIG. 3a in greater detail. The two beams are also recombined by the Wollaston prism, but not until after one ($f_2$) has been phase shifted with respect to the other ($f_1$) due to any variation in surface height, $\Delta h$, of the face of an object being rotated on an axis passing through the focus point $P_1$.

Figure 4B:
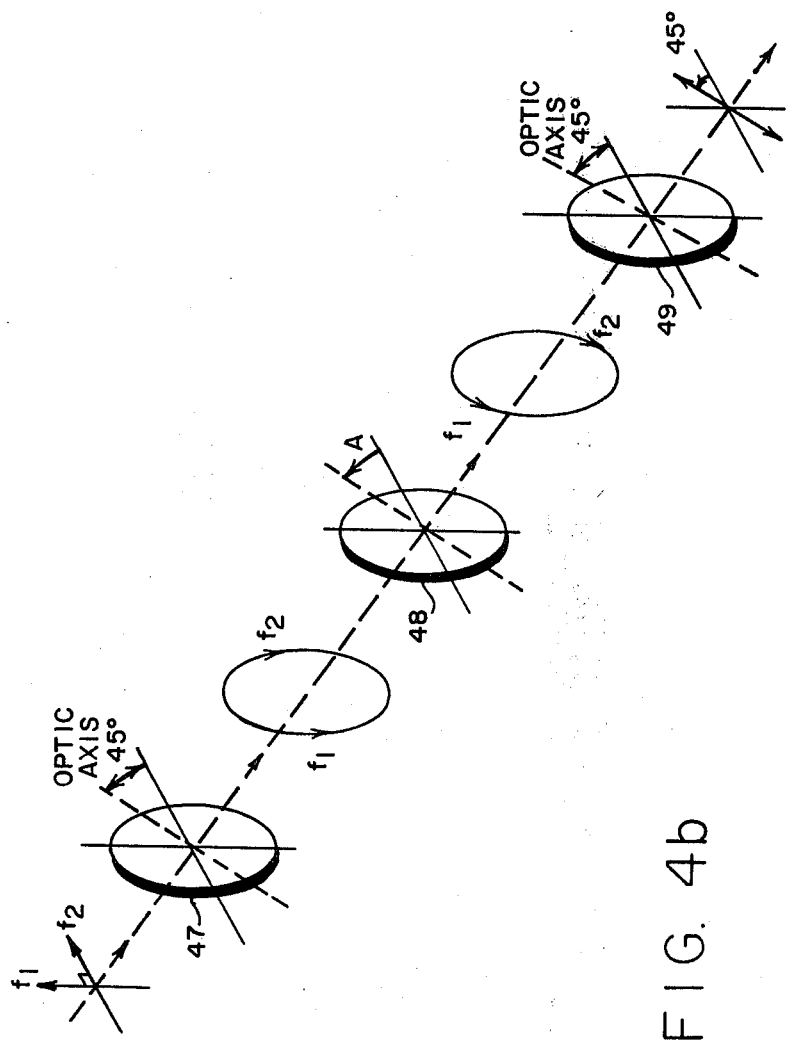
FIG. 4b is an optical diagram of the zero-phase adjustment process.

The organization and operation of the phase detector 12 will now be described with reference to FIG. 4a. The beam from the laser passed by the beam splitter 11 is transmitted through an adjustable phase shifter in the reference channel in order to initially adjust the output of the phase detector for zero phase shift with respect to the heterodyned measurement beam returned from the face of the object under test. The phase shifter is comprised of a fixed quarter-wave plate 47 and a rotatable half-wave plate 48. The quarter-wave plate has its optic (fast) axis at 45° from the horizontal, as shown in FIG. 4b, to convert the linearly and orthogonally polarized light components into left and right circularly polarized components, as shown in FIG. 4b. The half-wave plate then rotates the phase of the left and right circularly polarized components to linearly and orthogonally polarized components, with a phase according to the angle A of the optic axis of the half-wave plate, as shown in FIG. 4b. The polarizer 49 then produces a linearly polarized signal with this adjusted phase.

The phase of the measurement beam relative to the reference beam is measured by detecting the phase of the measurement beam through a polarizer 50. Photodetectors 51 and 52 then detect separate signals of the difference frequency with the phases of the beams out of the polarizers 49 and 50. The reference beam produces a signal $S_R$ at the output of the photodetector 51 that is then compared in phase to the signal $S_M$ produced by the measurement beam at the output of the photodetector 52. The comparison is made in a phase comparator 53. A variable neutral density filter 54 is placed in front of the polarizer 50 for adjustment of light intensity to the linear range of the detector 52. The manner in which this occurs is as follows. The amplitudes of the two orthogonally polarized components produce at the output of each of the photodetectors 51 and 52 an intensity signal, S, given by the expression:

$$S = |v_1 + v_2|^2, \quad (1)$$

where
$v_1 = e[\exp(k_1 Z_1 - \omega_1 t)]$,
$v_2 = e[\exp(k_2 Z_2 - \omega_2 t)]$,
$k$ = wave number, i.e., $2\pi/\lambda$ ($\lambda$ = wavelength),
$\omega = 2\pi f$ (f = frequency), and
t = time The subscripts 1 and 2 distinguish the optical parameters for the two different frequency components in each case.

The signals from the reference photodetector 51 and the measurement photodetector 52 are given by the following expressions:

$$S_R \approx 1 + \cos[Z_R(k_2 - k_1) - \omega' t], \quad (2)$$

where
$\omega' = \omega_2 - \omega_1$, and
$Z_R$ = reference beam distance;

$$S_m \approx 1 + \cos\left[Z_M(k_2 - k_1) + Z\frac{(k_2 + k_1)}{2} - \omega' t\right], \quad (3)$$

where
$Z_M$ = average measurement beam distance, and
Z = difference in distance between the reference beam and the measured beam.

From the foregoing it is seen that the phase difference, $\Delta\phi$, between the two signals is given by the difference in the arguments of the two cosines, as follows:

$$\Delta\phi = (Z_M - Z_R)(k_2 - k_1) + \tfrac{1}{2}Z(k_2 + k_1) \quad (4)$$

where $$k_1 = \frac{2\pi}{c}\left(f - \frac{f'}{2}\right)$$

$$k_2 = \frac{2\pi}{c}\left(f + \frac{f'}{2}\right)$$

c = speed of light
f = center of frequency of laser
f' = Zeeman frequency, i.e., 2 MHz From the above expressions for $k_1$ and $k_2$, their sums and differences yield the following expressions:

$$k_2 - k_1 = \frac{2\pi f'}{c}$$

$$k_2 + k_1 = \frac{4\pi f}{c}$$

Substituting these expressions into the equation for the phase difference, $\Delta\phi$, given above, gives the following equation for the absolute phase of the measurement beam relative to the reference beam:

$$\phi = \frac{2\pi}{c}(Zf - Z'f') + \text{constant} \quad (5)$$

where $Z' = Z_M - Z_R$

Since only the change in phase, $\Delta\phi$, due to surface profile is important, the expression for the phase change may be written as follows:

$$\Delta\phi = \frac{2\pi}{c}(f\Delta Z + Z\Delta f - f'\Delta Z' - Z'\Delta f') \quad (6)$$

In the parenthesis, only the first term, $f\Delta Z$ is significant; the other terms are negligible error terms. That first term is a measurement of surface height, $\Delta h$, because the expression $$\Delta\phi = \frac{2\pi}{c}f\Delta Z \quad (7)$$

which results from considering only the significant term, can be written as $$\Delta\phi = \frac{2\pi}{\lambda}\Delta Z. \quad (8)$$

From the geometry of FIG. 3b; $\Delta Z$ is found to be $$\Delta Z = \Delta h\,(2l/\sqrt{l^2 + b^2}) \quad (9)$$

where
l = the focal length of the lens 16, and
b = offset to the center of the incident or reflected beam from the optical axis of the birefringent prism assembly.

It follows from Equation (9) that $\Delta h$ is given in terms of measurable quantities by the expression $$\Delta h = \left(\frac{\lambda\sqrt{l^2 + b^2}}{4\pi l}\right)\Delta\phi = K\Delta\phi \quad (10)$$

where K is a constant equal to the value of the fraction in Equation (10).

Figure 5A:
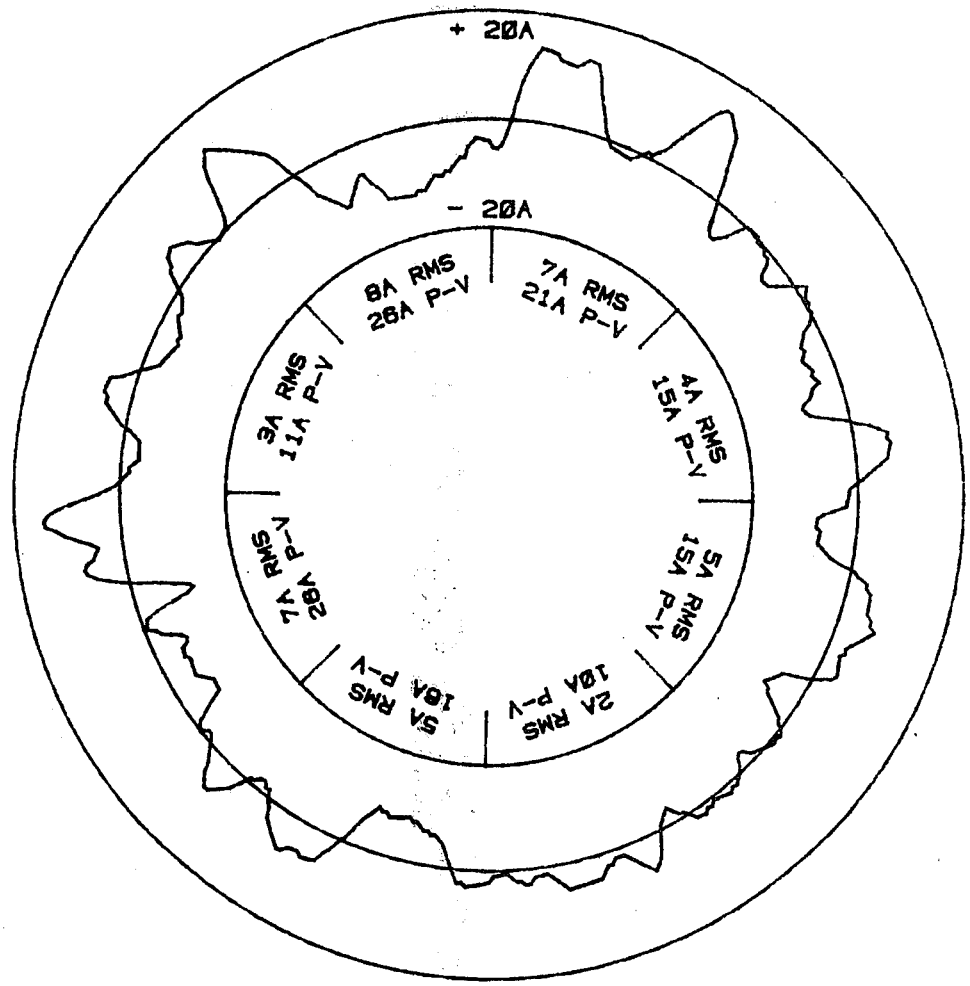

The outputs ($S_R$ and $S_M$) of the photodetectors 51 and 52 are continually compared in phase to produce an output signal proportional to $\Delta\phi$ for recording as a function of angular position, $\theta$, of the object 18. The computer (FIG. 1) then computes $\Delta h$ for each position of the object as it is rotated and, through a plotter 23, records the surface profile as shown in FIG. 5a. The computer receives angular position data from the tachometer 26 which emits a predetermined number (e.g. 512) of evenly spaced pulses from each revolution of the pressure roller 24. Angular position may thus be determined at all times by the computer which simply counts tachometer pulses. Alternatively, the computer may simply count clock pulses beginning with a pulse from the index transducer 27 if the speed of rotation of the turntable is maintained constant. In that case the tachometer 26 is omitted, and only the index transducer 26 is used. The count at any time after the index pulse is a direct measure of angular position. The computer may simply transmit this count as a plotting control signal for recording the computed signal $\Delta h$. A SYNC signal derived from the index pulse produced by the transducer 27 is used to initiate each 360° plotting cycle.

The surface profile data plotted in FIG. 5a as a function of angular position are not plotted in real time. Instead, the data of one revolution of the object are stored for processing before plotting. Each 45° segment of data is analyzed to determine its root mean square (RMS) value and the maximum peak-to-valley (P-V) amplitude in Angstroms. These data are then printed in the corresponding segments of the plot. The RMS and P-V values for the entire 360° plot are also calculated and printed, together with some descriptive information of the particular object under test, which is shown as BK-7 in FIG. 5a, the data and time. A Fourier analysis of the data before plotting permits taking out of the Fourier series, the first three terms which are a constant, $A_o$, a $\sin \phi$ term due to any tilt of the table, and a $\sin 2\phi$ term due to any astigmatism. The amplitude of this third term is determined and printed, which is 3 Å ASTIG for the example of FIG. 5a. The plot shown in FIG. 5a is an actual data plot made on the data and time indicated.

The surface profile data are further analyzed to determine its autocovariance function, which is the variation of the data as the data of one revolution is angularly displaced for comparison with the undisplaced data. This variation is determined for displacement (rotation) in units of arc length, where the displacement units are selected to be, for example, micrometers. This autocovariance function for the data of FIG. 5a is shown in FIG. 5b as actually calculated and plotted.

A spectral density function for the data plotted in FIG. 5a is also computed and plotted as shown in FIG. 5c, where the abscissa is the logarithm of theoretical scattering angles from a beam axis normal to the surface, and the ordinate is the fraction of incident light at those angles. The data is based upon the slopes and amplitudes of peaks and valleys found in the data of the graph in FIG. 5a. A total geometric reflection value is also computed, which is shown to be 0.99986 for this example.

Height and slope distribution functions are also plotted as shown in FIGS. 5d and 5e. Both are normalized for a scale of three units along the abscissa, so that for each unit, such as 2, the abscissa must be multiplied by the normalizing factor. For the height distribution function, the normalizing factor is 5.9 Å RMS, and for the slope distribution, the normalizing factor is 1.0 Å per micrometer RMS. For example, at the abscissa of 2, the height distribution is $2 \times 5.9$ Å RMS and the slope distribution is $2 \times 1.0$ Å/$\mu$m RMS. These functions should follow the Gaussian distribution curves shown in the figures. Any departures from that normal distribution would indicate something other than random distribution of height and slope variations. This is valuable information in determining what further action should be taken in polishing the surface under test. These and other data processing functions are not per se a part of this invention. The invention in which the novelty resides is in the arrangement of the optical elements as described with reference to FIGS. 1, 4a and 4b. The phase detector shown in FIG. 4a includes a novel optical arrangement for phase shifting the reference beam in order to zero-adjust the system as shown in FIG. 4b. Otherwise, the phase detector is comprised of conventional electrical components, namely photodetectors 51 and 52, such as Hewlett Packard photodetector Model 10780, and a phase comparator 53 which may consist of a Hewlett Packard Model 3575 phase comparator.

All of these functions shown in FIGS. 5b, c, d and e are as actually determined by the programmed digital computer from the data used to plot the surface profile graph in FIG. 5a. Computation for a small desk-top computer, such as a Hewlett Packard Model 9825, actually used, requires less than five minutes. A larger computer could decrease the time required not only by faster processing, but also by computing the next function to be plotted while plotting the last one computed. The plotter actually used in this example was a Hewlett Packard Model 9872, but other plotters could be used just as well, such as a Model 6000 Strip Plotter/Printer manufactured by Houston Instrument, a Division of Bausch & Lomb. That plotter/printer employs thermal recording on a strip chart and alphanumeric printing for annotation of a graphic display of processed data. For example, the height variation, $\Delta h$, recorded as a function of angular position, $\theta$, on a circular track with the origin at the top, could just as well be recorded in a strip with the origin at the left. The evenly divided sectors on the circular track could just as easily be divided on the linear track of a strip chart.

FIG. 6 illustrates schematically in an isometric view, the arrangement of optical components in an exemplary embodiment successfully tested. For convenience, the components referred to in FIG. 1 are identified generally in FIG. 6 by the same reference numerals as in FIG. 1. Components added are generally only mirrors to so bend the beams as to fit the entire optical instrument in an enclosure as shown, except for a spatial filter telescope 60 comprised of input and output lenses 61 and 62, and a pinhole 63 for rejecting noise in the laser beam. The lenses serve to focus the beam on the pinhole and to then restore the beam to a well defined narrow beam.

The table 20 is set to rotate on a plane normal to the beam axis, but that is not a precise requirement of the invention. If the table rotation is such that the surface 17 under test is at some angle other than precisely 90° from the beam axis, the phase shift data will be modulated by a sinusoidal function at the relatively low frequency of table rotation. That, of course, will introduce a significant error at each data point, but the nature of the error is such that it can be easily filtered out of the data, as noted hereinbefore. In practice, the computer stores data from a complete 360° rotation and begins processing the data only after the data has been entered.

Although particular embodiments of the invention have been described and illustrated herein, it is recognized that modifications and variations may readily occur to those skilled in the art. For example, focusing one beam on a point at the axis of rotation permits plotting absolute values of Δh using that fixed point as a reference. In some applications the fixed point may not be on the face of the object under test, but rather on a reference surface, provided that any vertical motion of the object due to any vibration of the moving mechanism is imparted to the reference surface equally. In that event, the object under test may be moved in a linear path. Another, perhaps more practical application may be to focus both frequency components on the face of the object being tested and obtain only a relative surface profile as the focus points of both frequency components are caused to vary due to surface irregularities. This would yield at least some information about the smoothness of the surface, and if nothing more provide an acceptance test for optical components that have been ground to be optically flat for use in instruments. Consequently, it is intended that the claims be interpreted to cover such modifications and equivalents.

What is claimed is:

1. A method for testing the deviation of the face of an object from a flat smooth surface comprising the steps of generating a dual frequency beam of coherent light having a stable frequency difference with a constant reference phase, splitting said beam into first and second frequency components, directing said separating components onto spaced apart points on the face of said object, recombining said components into a single beam after reflection from said points, rotating said object about an axis normal to said face with respect to said first of said split components so as to have said second one of said components reflected from points along a circular track on said face while the first component is continually reflected from a stationary point on said axis at the center of rotation of said object, and measuring the phase shift of the difference frequency of said components in the recombined beam as a measure of the variation of said face from a flat smooth surface.

2. A method as defined in claim 1 including the steps of monitoring the position of said object, and recording said measured variation as a function of object position.

3. A method for testing the deviation of the face of an object from a flat smooth surface comprising the steps of generating a beam of coherent light of two components, one of a frequency constantly greater than the other by a fixed amount to produce a difference frequency with a constant reference phase, splitting said beam into its two components and directing said separate components onto spaced apart reflecting points, at least one of which is on said face to be tested for smoothness, moving the face of said object to pass under at least said one component, recombining said two components after reflection from said points to produce a reflected frequency difference of a phase changed in proportion to the difference to path length of one component reflected from one point to the other component reflected from the other point, and comparing the phase of said reflected frequency difference with said constant reference phase to produce a signal proportional to the change of phase of said reflected frequency difference from said constant reference phase as said face is moved, and wherein the other of said points is selected to reflect light from a fixed position, thereby to produce a signal that is a measurement of the profile of said surface along a track over which said one component passes, and further wherein said fixed position is on said face, and movement of said face is rotational to pass said one component over a circular track on said face while the other component is reflected from a fixed position at the center of rotation, thereby to produce a phase which, upon being detected, provides a signal that is an absolute measurement of the profile of said surface along said circular track.

4. A method as defined by claim 1, 2 or 3, including the step of initially adjusting the phase of said reflected frequency difference to coincide with said instant reference phase.

5. A method as defined by claim 4, wherein the step of initially adjusting the phase of said reflected frequency difference to coincide with said constant phase includes the steps of converting said components into fixed circularly and oppositely polarized forms, directing said circularly polarized components through a half-wave plate capable of having its optic axis rotated through an angle for shifting the phase of said circularly polarized components as a function of said angle, passing said circularly polarized and phase shifted components through a first polarizer, and detecting the light passed by said first polarizer to produce a signal having a phase that depends on the orientation of said half-wave plate, passing said reflected components through a second polarizer, detecting the light passed by said second polarizer to produce a signal having a phase that depends upon the phase of the frequency difference of said reflected components, comparing the phase of the two signals thus produced, and rotating said half-wave plate to bring said two signals into phase.

6. A method as defined in claim 5 wherein said half-wave plate may be rotated through 360°, whereby said constant phase may be shifted through 360° to bring it into phase with the phase of the frequency difference of said reflected components.

7. A system for testing the deviation of the face of an object from a flat smooth surface comprising means for generating a dual frequency beam of coherent light having a stable frequency difference, optical means for splitting said beam into first and second frequency components, for directing said separated components onto spaced apart points on the face of said object, and for recombining said components into a single beam after reflection from said points, means for rotating said object about an axis normal to said face with respect to said first of said split components so as to have said second one of said components reflected from points along a circular track on said face while said first component is continually reflected from a single point on said axis at the center of rotation of said object, and means for measuring the phase shift of the difference frequency of said components in the recombined beam as a measure of the variation of said face from a flat smooth surface.

8. A system as defined in claim 7 including means for monitoring position of said object, and means for recording said measured variation as a function of object position.

9. A system for testing the deviation of the face of an object from a flat smooth surface comprising means for generating a beam of coherent light having two components of distinct frequencies which produce a constant frequency difference of fixed phase, optical means for splitting said beam into a measurement beam and a reference beam each with two frequency components, said measurement beam being split into its two frequency components, and directing said components of said measurement beam on two spaced apart focus points on the face of said object, and for recombining said two measurement beam components upon reflection from said face, means for rotating said object about an axis normal to said face at one of said focus points, thereby to vary the phase of the difference frequency of the recombined frequency components of the reference beam as a function of optical path length of said components, thereby to measure height deviation of said surface along a circular track reflecting one component with respect to the fixed point reflecting the other component, and means for continually comparing the phase of the frequency difference in said reference beam with the changing phase of the frequency difference in said measurement beam, thereby to obtain a signal proportional to height deviation of said face from a flat smooth surface along said circular track.

10. A system as defined in claim 9 including means for continually computing from said signal the surface height deviations, means for monitoring angular position of said object, and means for recording the computed surface height deviation as a function of angular position of said object.

11. A system as defined in claim 9 or claim 10 including optical means for adjusting the phase of the frequency difference in said reference beam with respect to the phase of the frequency difference in said measurement beam for an initial condition, thereby providing zero adjustment for surface height measurement of said face.

12. A system as defined in claim 11 wherein said components of said beam from said generating means are orthogonal plane-polarized components, said optical phase adjusting means is comprised of a quarter-wave plate having its optic axis at 45° with respect to said plane-polarized components, thereby to convert said plane-polarized components to left and right hand circularly polarized components, a half-wave plate capable of having its optic axis rotated, and a polarizer, said half-wave plate being positioned to transmit said circularly polarized components from said quarter-wave plate to said polarizer with a phase shift dependent upon the orientation of said half-wave plate.

13. Apparatus for testing the deviation of the face of an object from a flat smooth surface comprising means for generating a beam of coherent light of two components, one of a frequency constantly greater than the other by a fixed amount to produce a difference frequency with a constant reference phase, means for optically splitting said beam into its two frequency components and directing said separate components onto spaced apart reflecting points, at least one of which is on said face to be tested for smoothness, and for recombining said two components after reflection from said points to produce a reflected frequency difference of a phase changed in proportion to the difference in path length of one component reflected from one point to the other component reflected from the other point, means for moving said object to pass said face under at least one component, and means for comparing the phase of said reflected frequency difference with said constant frequency phase to produce a signal proportional to the deviation of the phase of said reflected frequency difference from said constant reference phase as said face is moved, and wherein the other of said points is selected to reflect light from a fixed position, thereby to produce a signal that is a measurement of the profile of said surface along a track over which said one component passes, and further wherein said fixed position is on said face, and means for moving said object rotates said object on an axis passing through said fixed position, and said fixed position is on the face of said object, thereby to pass said one component over a circular track on said face while the other component is reflected from a point at the center of the track, thereby to produce a signal that is an absolute measurement of the profile of said surface along said circular track.

14. Apparatus as defined in claims 13, including means for initially adjusting the phase of said reflected frequency difference to coincide with said reference phase.

15. Apparatus as defined by claim 14, wherein said means for initially adjusting the phase of said reflected frequency difference with said reference phase includes means for placing said components into a fixed circularly and oppositely polarized form, a half-wave plate in the path of said circularly polarized components, said half-wave plate being capable of having its optic axis rotated through an angle for shifting the phase of said circularly polarized components as a function of said angle, a first polarizer in the path of said circularly polarized and phase shifted components from said half-wave plate, means for detecting the light passed by said first polarizer to produce a signal having a phase that depends on the orientation of said half-wave plate, a second polarizer in the path of said reflected components, means for detecting the light passed by said second polarizer to produce a signal having a phase that depends upon the phase of the frequency difference of said reflected components, and means for comparing the phase of the two signals thus produced, whereby said half-wave plate may be rotated to a position required to bring said two signals into phase.

* * * * *